June 30, 1959   J. L. FORD   2,892,641
MOUNTING FOR FLUID METER
Filed July 10, 1956
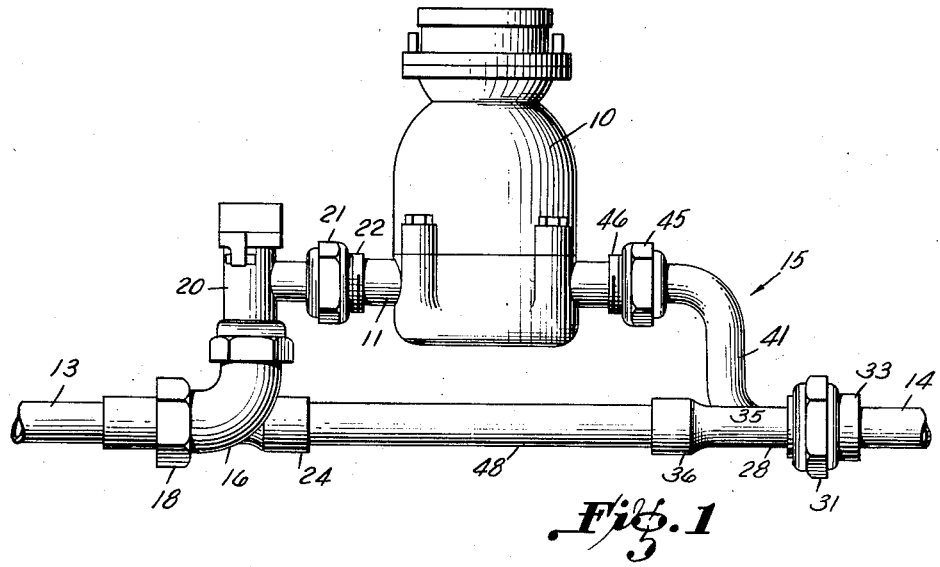
Fig. 1
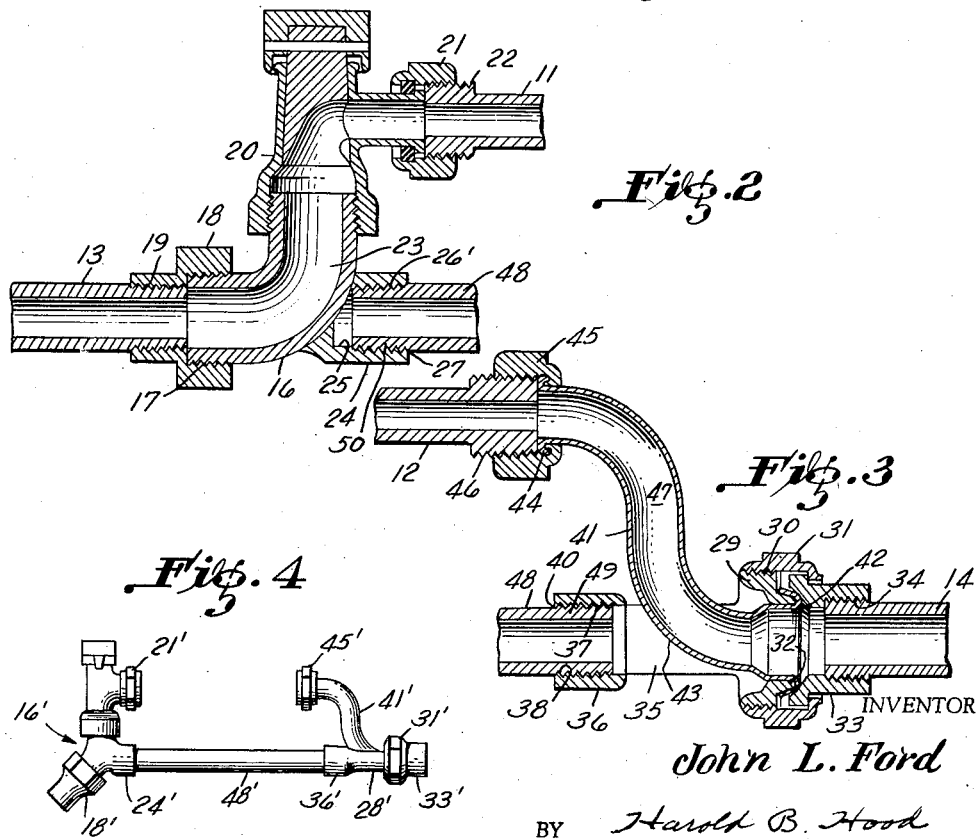
Fig. 2
Fig. 3
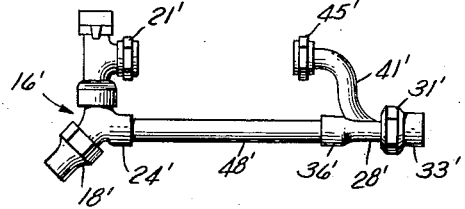
Fig. 4
INVENTOR
John L. Ford
BY Harold B. Hood
ATTORNEY

United States Patent Office 2,892,641
Patented June 30, 1959

2,892,641
MOUNTING FOR FLUID METER

John L. Ford, Wabash, Ind., assignor to The Ford Meter Box Company, Inc., Wabash, Ind., a corporation of Indiana Application July 10, 1956, Serial No. 596,932

1 Claim. (Cl. 285—30)

The present invention relates to meter mountings, and is primarily intended to provide an improved mounting, similar to that disclosed in my prior Patent No. 2,438,497, issued March 30, 1948 (Reissue 23,091, dated March 15, 1949).

The primary object of the present invention is to provide a shallow mounting for a water meter, or the like, having the advantages of the mounting disclosed in my above-identified prior patent, but being free from the defects of that prior structure.

Further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claim is not violated.

Fig. 1 is an elevational view of a meter mounting constructed in accordance with the present invention, set in a fluid supply line and supporting a meter in operational position;

Fig. 2 is an enlarged, fragmental section, taken in a plane parallel with the plane of Fig. 1, and showing the detailed construction of one end of my improved meter mounting;

Fig. 3 is a similar view showing the opposite end of the meter mounting; and

Fig. 4 is a reduced elevational view of a modified embodiment of my meter mounting.

Referring more particularly to the drawings, it will be seen that I have illustrated a conventional water meter 10 having oppositely projecting spuds 11 and 12 and adapted for connection between spaced sections 13 and 14 of a fluid supply line. My improved mounting, which is indicated generally by the reference numeral 15, is adapted to be physically connected between the line sections 13 and 14, and to the spuds 11 and 12, to support the meter 10 and to provide a flow line therethrough between the line sections 13 and 14.

As will appear, the mounting 15 comprises two fittings, suitably connected together, each fitting being adapted to be connected to one section of the supply line and to one spud of the meter. The fitting 16 comprises, in the embodiment of my invention illustrated in Fig. 1, a 90° elbow and a valve 20. It will be apparent, as the description proceeds, that the valve may be integral with the elbow, or that an S fitting may be substituted for the elbow 16 and valve 20. I prefer to provide valve means in the fitting 16, in order that the pressure side of the supply line may be shut off directly at the meter mounting when it is desired to remove the meter; but the presence or absence of such a valve is immaterial to the present invention.

Suitable means is provided for connecting one end of the fitting 16 to the line section 13. As shown, the lower end of the fitting is externally threaded as at 17 to receive a union 18 which is internally threaded for engagement with the threads 17 and for engagement with threads 19 formed on the line section 13. Of course, any other suitable coupling means may be used in place of that here illustrated.

At its opposite end, the fitting 16 is designed for connection to the meter spud 11. As shown, a swivel coupling 21 is carried upon the upper end of the fitting 16 and is internally threaded for engagement with threads 22 formed on the adjacent end of the meter spud 11. The fitting 16 thus provides a fluid passage 23, one end of which is coaxial with the line section 13 and the other end of which is located upon an axis offset from the axis of the line section 13.

A cup 24 is carried upon the fitting 16; and I prefer to form the cup integrally with said fitting, as suggested in Fig. 2. The cup is formed to provide a blind socket 25 which is preferably internally threaded as at 26 and whose mouth 27 faces generally in the direction of the upper end of the passage 23, preferably upon an axis parallel with the axis of the upper end of said passage.

The other fitting 28 is shown in detail in Fig. 3 and comprises a collar 29 designed for connection to the line section 14. Any suitable form of coupling means may be used; but I have shown the collar 29 externally threaded as at 30 for the reception of a coupling nut 31. Preferably, that end of the collar 29 which faces away from the fitting 16 is formed with an axially-projecting, peripheral bead 32 for a reason which will appear. In the coupling means illustrated, I include a sleeve 33 formed, at its inner end, with a tapered face and, near its outer end, with internal threading 34 for engagement with the threaded end of the line section 14.

Projecting from the collar 29 at peripherally-spaced points, I provide a plurality of spaced arms 35 substantially parallel with the axis of the collar 29; and, at their distal ends, said arms 35 carry a socket-forming means such as a ring 36. In the illustrated form of the invention, I provide two such arms 35, diametrically spaced from each other. The ring 36 is formed to define a socket 37, interiorly threaded as at 38; and it will be apparent that the bounding walls of the socket 38 are substantially spaced, in a generally-axial direction, from the collar 29. The mouth 40 of the socket 37 faces away from the collar 29. If desired, the means 36 may be a cup having a floor facing the collar 29 but substantially spaced therefrom.

A conduit 41, which is preferably formed of ductile material, such as copper tubing, has one end portion disposed in, and penetrating, the collar 29; and its extremity 42 is preferably turned outwardly and rearwardly over the bead 32 in such a position that, when the nut 31 is turned down upon the collar 29, the bevelled surface of the sleeve 33 will bear upon the rebent portion of the conduit end to provide a tight fluid seal.

As shown, the conduit 41 is substantially S-shaped; and an intermediate portion 43 thereof is disposed in, and traverses, the space between the collar 29 and the socket 37, the conduit 41 being wholly spaced from the ring 36 which defines the boundary walls of the socket 37. The opposite end portion 44 of the conduit 41 is disposed upon an axis which is offset from, and parallel with, the axis of the collar 29; and said opposite end portion is designed for connection to the spud 12 of the meter 10. Any suitable connecting means may be used, but, in the present drawings, I have shown the conduit end formed with an external bead engaged by a coupling nut 45 adapted to be engaged with the threads 46 on the end of the spud 12.

It will be seen that, when the mouths 27 and 40 of the sockets 25 and 37 are arranged in coaxial, spaced relation, the design of the passage 23 and the conduit 41 will bring the upper end of the passages 23 and 47 into coaxial relation so that, if the fittings 16 and 28 are properly spaced apart, the upper ends of those passages will automatically be positioned for connection to the spuds 11 and 12, respectively. The fittings 16 and 28 are normally held in that relationship by an element 48 having one end 49 seated in the socket 37 and its other end 50 seated in the socket 25. Preferably, but not necessarily, the ends of element 48 will be threadedly engaged in the respective sockets.

It has been found, in practice, that an occasional user of water, gas or other fluid will tamper with the mounting of my above-identified prior patent by drilling a hole from the interior of the socket 27 thereof, through the adjacent wall of the fitting 13 and through the nested portion of the conduit end 21, and by drilling another hole from the interior of the socket 40 through the adjacent portion of the fitting 28 and through the nested portion of the end of tube 34, thereby providing a by-pass between the sections 18 and 32 of the supply line, whereby fluid may flow from the point of supply to a point of use without passing through the meter 10, as illustrated in that patent.

It will be clear that the present structure guards against such thievery by reason of the fact that the walls of the passage 47 are everywhere spaced from the walls of the socket 37. While it would be possible to drill from the socket 25 into the passage 23, it is not possible thus to provide an opening from the socket 37 communicating with the interior of the passage 47; and therefore, it is not possible (at least, without the use of a clearly visible conductor tube extending through the space between the arms 35) to establish a by-passage, through the meter mounting, around the meter 10.

In most installations, the line sections 13 and 14 are coaxial, as shown in Figs. 1 to 3; and the mounting heretofore described is optimum for such situations, the axis of the element 48 being coincident with the common axis of the line sections 13 and 14. Occasionally, however, it is desirable to mount a meter between line sections which are not coaxial; and in Fig. 4 I have shown a meter mounting designed for such situations.

In the form of Fig. 4, the fittings 16' and 28' are provided with socket-providing means 24' and 36' for the reception of the opposite ends of an element 48' identical with the element 48. When the fittings are so connected, the sleeve 33' may be connected to one line section, and may be secured to the collar of the fitting 28' by means of a nut 31'. Thus, the tube 41' is so positioned that its coupling nut 45' may be readily engaged with one spud of a meter. The coupling device 18' is located upon an axis angularly related to the axis of the coupling member 31', for engagement with a correspondingly-located line section; and thereby the coupling member 21' is disposed for engagement with the other spud of a meter.

Obviously, it is desirable that the element 48 shall be tubular, rather than solid, so that both the weight and the cost of the part shall be minimzed.

I claim as my invention:

A meter mounting comprising a first fitting designed for physical connection between a portion of a fluid supply line and one spud of a meter and to establish a fluid passage therebetween, means carried by said fitting and providing a socket, a second fitting comprising a collar, spaced arms projecting from said collar in substantial parallelism with the axis of said collar, means supported at the distal ends of said arms and providing a second socket coaxial with said collar, a ductile tube having one end supported in and penetrating said collar and opening away from said socket-providing means, having an intermediate portion disposed between said arms, wholly out of contact with said socket-providing means, and extending, from between said arms, away from the axis of said collar, and having its other end disposed on an axis offset from the axis of said collar and facing substantially in the direction in which said second socket opens, an element having its opposite ends seated respectively in said sockets to secure said fittings in spaced relation, means for connecting said collar to another portion of such a fluid supply line, and means for connecting said other end of said tube to the other spud of such a meter.

References Cited in the file of this patent

UNITED STATES PATENTS

| | | |
|---|---|---|
| Re. 23,091 | Ford | Mar. 15, 1949 |
| 1,262,263 | Rust | Apr. 9, 1918 |
| 1,290,613 | McDonough | Jan. 9, 1919 |
| 1,988,003 | Ford | Jan. 15, 1935 |
| 2,574,982 | Mueller et al. | Nov. 13, 1951 |

FOREIGN PATENTS

| | | |
|---|---|---|
| 712,765 | France | Aug. 3, 1931 |